United States Patent [19]

Kawakita et al.

[11] 4,009,890
[45] Mar. 1, 1977

[54] DEVICE FOR CONNECTING WORKING IMPLEMENT TO TRACTOR

[75] Inventors: Hiroaki Kawakita; Shigeru Morita, both of Sakai, Japan

[73] Assignee: Kubota, Ltd., Osaka, Japan

[22] Filed: Mar. 12, 1976

[21] Appl. No.: 666,510

[30] Foreign Application Priority Data

Mar. 19, 1975 Japan .............................. 50-37326
May 21, 1975 Japan .............................. 50-69627

[52] U.S. Cl. .......................... 280/467; 280/456 A; 172/446
[51] Int. Cl.² ......................................... B60D 1/16
[58] Field of Search .............. 280/472, 467, 461 R, 280/461 A, 460 R, 460 A, 456 A, 504; 172/446, 667, 741, 415, 421, 395, 673, 439

[56] References Cited
UNITED STATES PATENTS

| | | | |
|---|---|---|---|
| 2,562,486 | 7/1951 | Denning | 172/446 |
| 3,062,563 | 11/1962 | Pearce | 280/461 A |
| 3,275,341 | 9/1966 | Ralston | 280/460 A |
| 3,401,509 | 9/1968 | Hurlburt | 280/415 R |

*Primary Examiner*—Joseph F. Peters
*Assistant Examiner*—R. Schrecengost
*Attorney, Agent, or Firm*—Armstrong, Nikaido & Wegner

[57] ABSTRACT

A device for connecting a rotary tiller unit, plow or like working implement directly to a tractor by three-point link system comprises connectors each including a connecting rod and a hitch pin to be inserted into a hitch hole at the rear end of the three-point link system. The connectors are mounted fixedly on a front portion of the working implement but are slidable laterally of the implement and mountable in their reversed position, whereby the working implement is connectable to the tractor in tandem or in offset arrangement, interchangeably between the tandem and offset positions.

5 Claims, 8 Drawing Figures

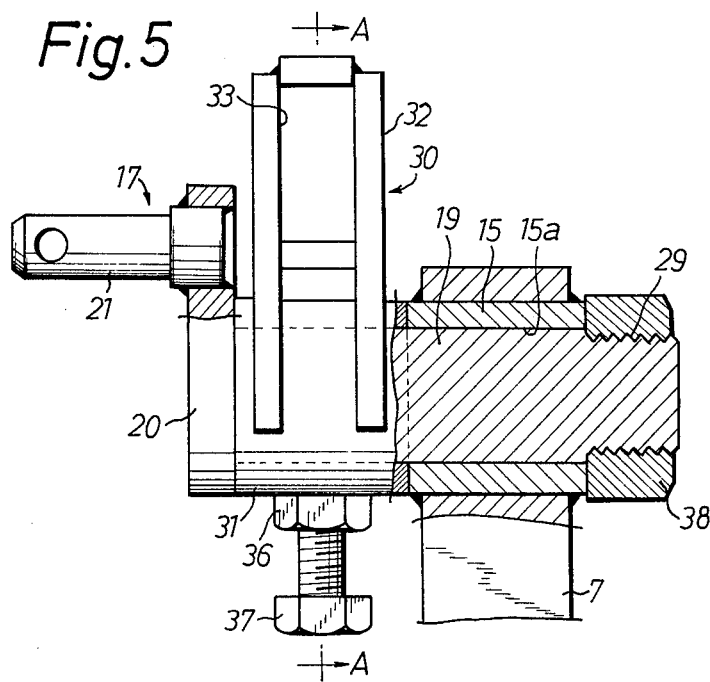
Fig.5
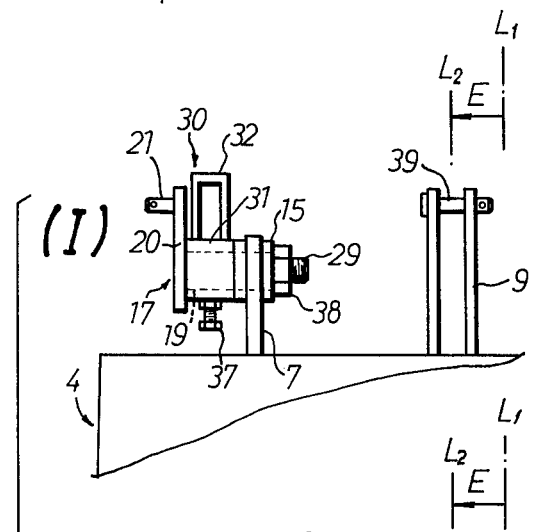
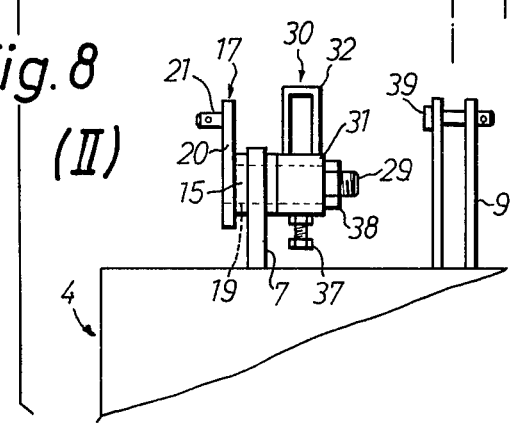
Fig.8

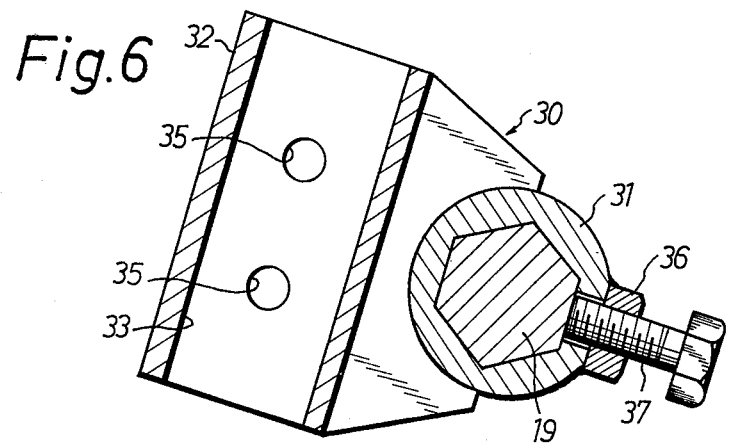
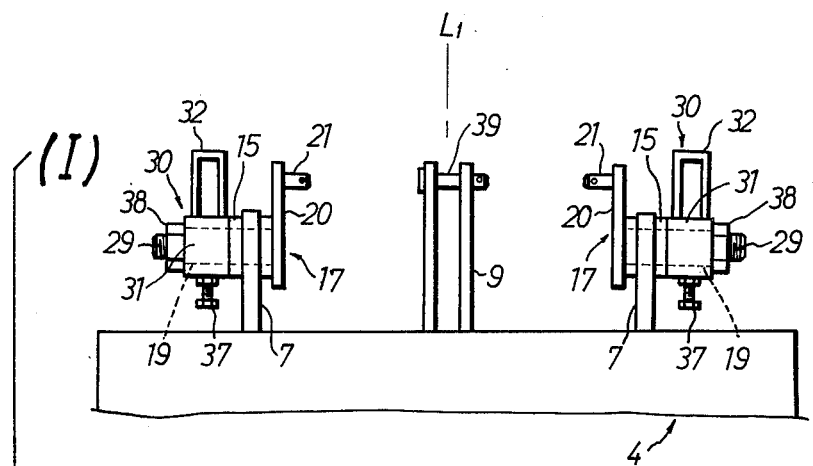
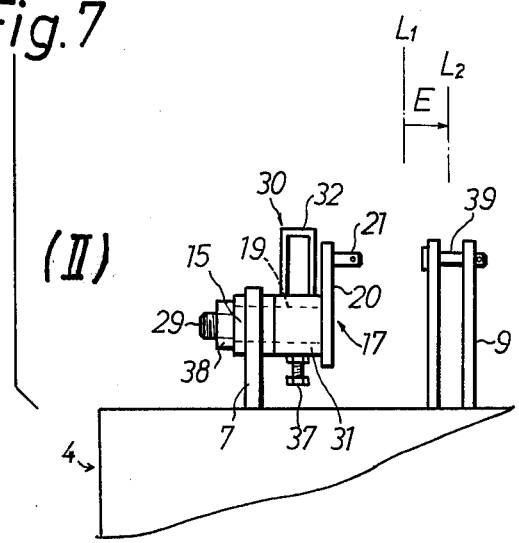

DEVICE FOR CONNECTING WORKING IMPLEMENT TO TRACTOR

BACKGROUND OF THE INVENTION

The present invention relates to devices for connecting working implements to tractors, and more particularly to a device for connecting a working implement to a tractor by three-point link system.

Three-point systems used for connecting a rotary tiller unit, plow or like working implement to the rear portion of tractors are designed to exhibit high working performance under hydraulic control.

When the three-point link system is used, there arises the necessity of connecting the implement to the tractor in tandem and also in offset position, because when the rotary tiller unit is connected to the tractor in offset arrangement, the outermost marginal area of the field can be completely treated. Thus it is desired to alter the arrangement of the working implement relative to the tractor in accordance with the working requirement.

Conventionally, a plurality of connector brackets are mounted on the front frame of the working implement at a specified spacing laterally thereof, and the three-point link system is connected at its rear end to the bracket selectively with use of hitch pins and hitch holes in the rear end of the system in order to render the working implement connectable to the tractor in either of tandem and offset positions interchangeably therebetween. However, since the connector brackets are secured to the front frame of the working implement, it is extremely difficult and troublesome to align the rear hitch holes of the three-point link system with the hitch pins. Moreover, the connection is not always smoothly operable free of troubles. Especially when the field is inclined and involves a difference in elevation in the transverse direction of the tractor and the implement, it is substantially impossible to adapt the connecting means for the situation. Furthermore when the working implement is arranged in offset position, the gauge wheels, which are subjected to the weight of the implement, should advantageously be shifted in conformity with the offset position, whereas the gauge wheels in the known structure are not shiftable and therefore not fully amenable to the operation of the tractor.

SUMMARY OF THE INVENTION

An object of this invention is to provide a device comprising connectors, each including a hitch pin, which are mountable fixedly on a pair of opposite brackets secured to a working implement, the connectors being slidable transversely of the implement and also mountable in their reversed position, so as to render the working implement readily and reliably connectable to the tractor in either of interchangeable tandem and offset arrangements.

Another object of this invention is to provide a device comprising connectors each including a connecting rod and a hitch pin which is connected to the rod eccentrically thereof to render the hitch pin shiftable in elevation and to thereby render the connecting portion adjustable in elevation easily and reliably.

Another object of this invention is to provide a device by which irrespective of whether the working implement is rearranged to tandem position or to offset position, the gauge wheels are readily shiftable to an optimum position in conformity with the rearrangement.

Still another object of this invention is to provide a connecting device which is simple in construction and easy to manufacture.

BRIEF DESCRIPTION OF THE DRAWINGS

FIG. 5 is an enlarged plan view showing part of FIG. 4 and partly broken away;

FIG. 6 is a view in section taken along the line A—A in FIG. 5; and

FIG. 7 (I), (II) and FIGS. 8 (I), (II) are plan views illustrating the embodiment as mounted in varying positions.

DESCRIPTION OF THE PREFERRED EMBODIMENTS

Figure 1:
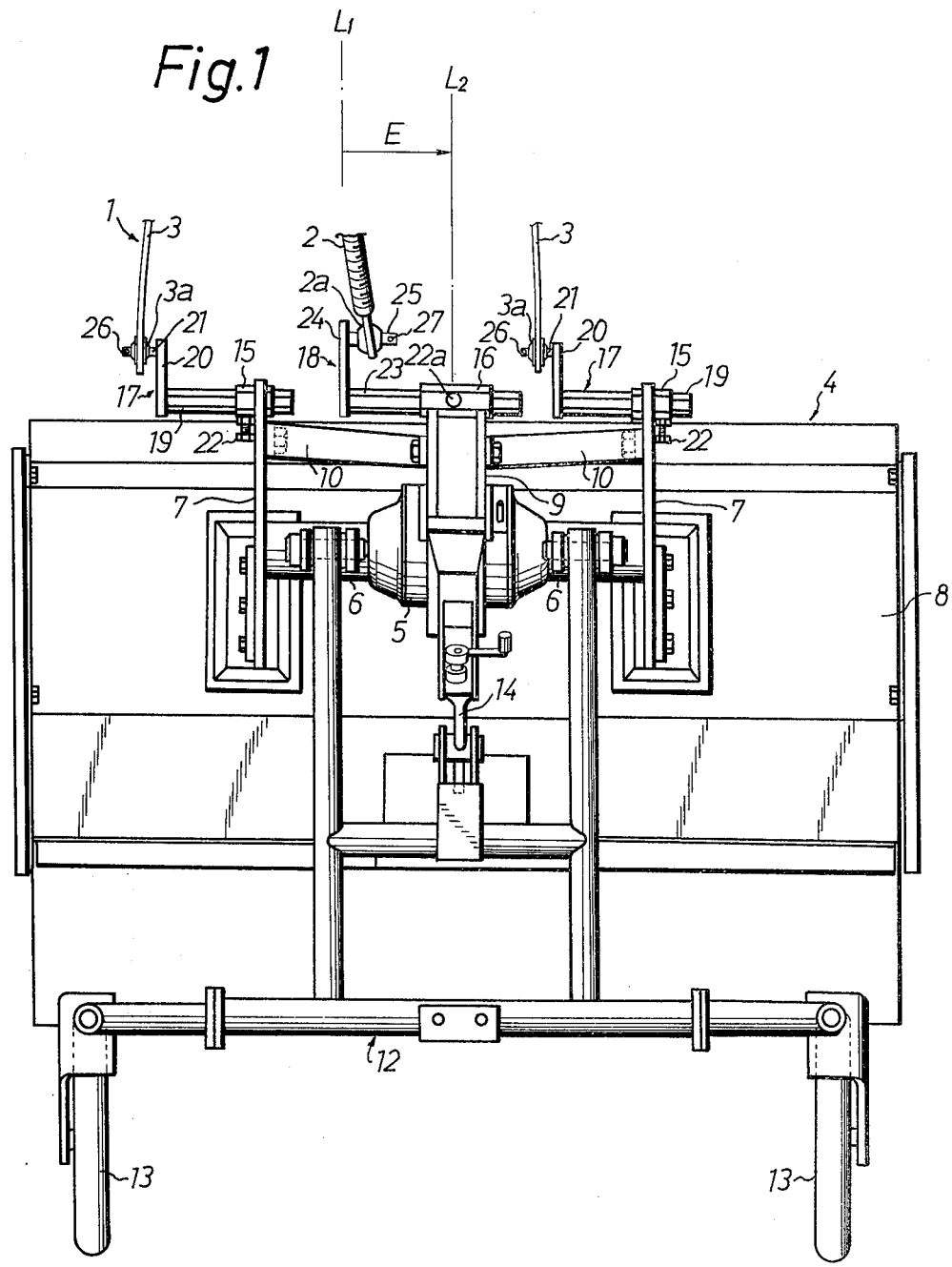
FIG. 1 is a plan view of an embodiment of this invention as adapted for a rotary tiller unit of the center drive type.
Figure 2:
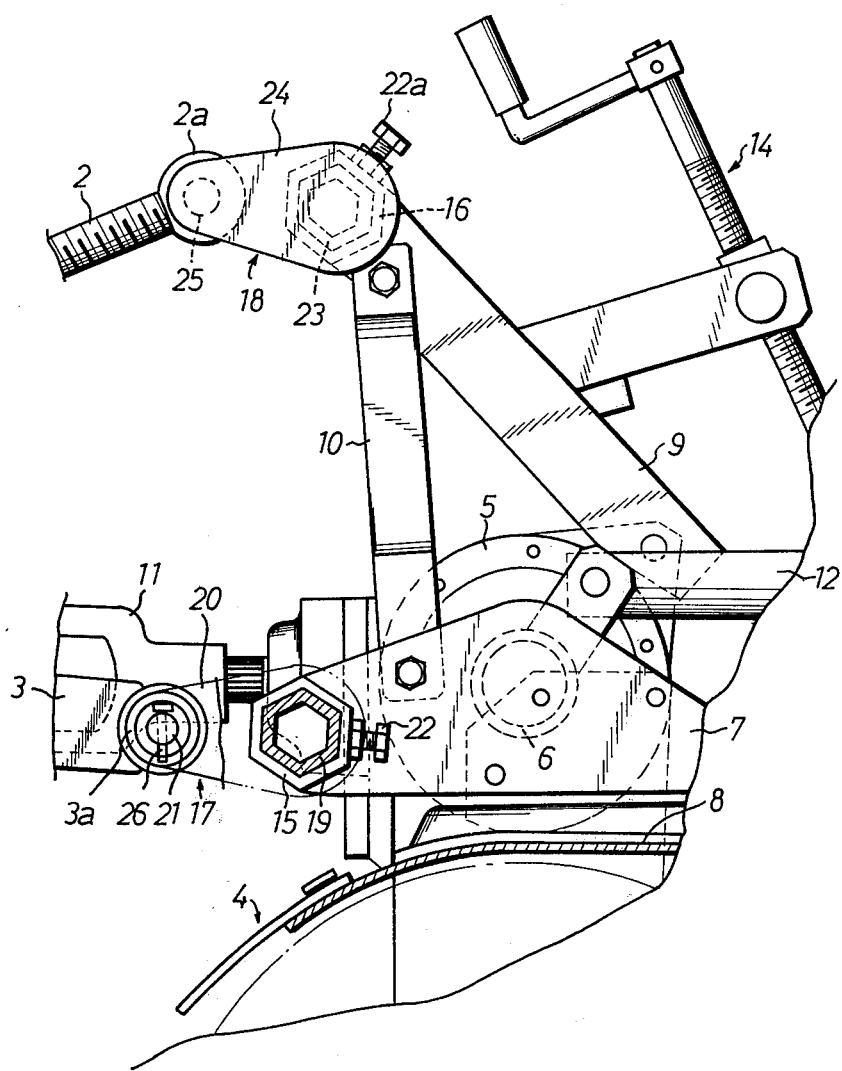
FIG. 2 is an enlarged view in side elevation showing the principal part of FIG. 1.
Figure 3:
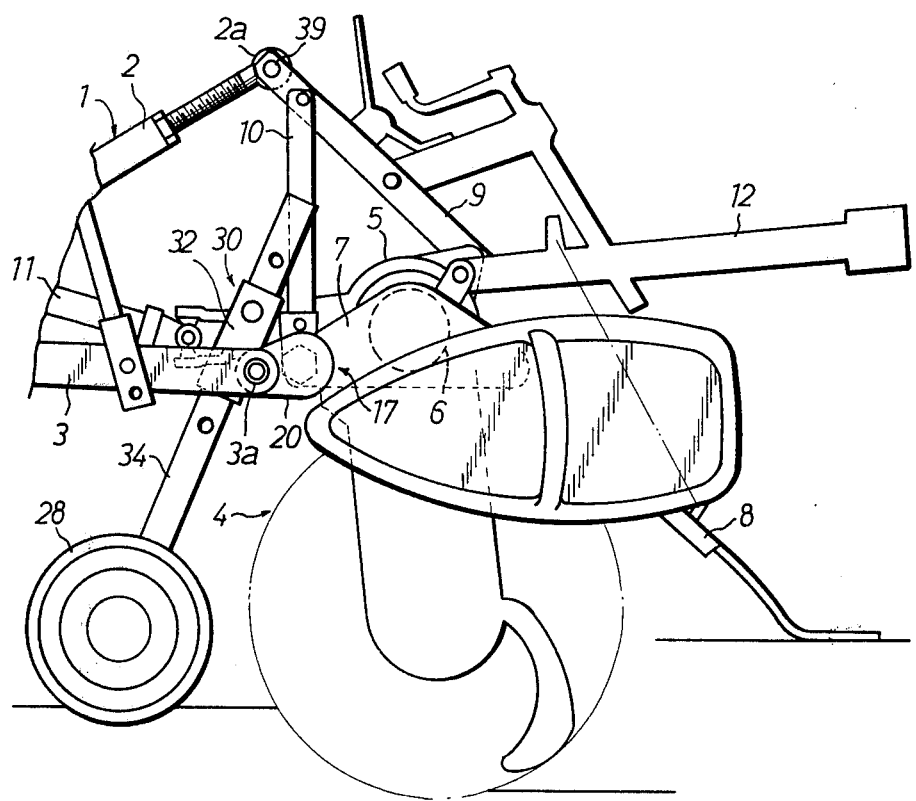
FIG. 3 is an overall side elevation showing a rotary tiller unit of the center drive type for which another embodiment of this invention is used.

With reference to FIGS. 1 and 2 showing a rotary tiller unit 4 of the center drive type as an example of working implements, a known three-point link system 1 comprises a central top link 2 and a pair of opposite lower links 3. The links are pivoted at their front ends to an unillustrated tractor body by lateral pins.

The links 2 and 3 of the three-point link system 1 have at their rear ends connecting portions 2a and 3a, each in the form of a ball socket having a hitch hole.

The rotary tiller unit 4 connected by the three-point link system 1 includes a center gear case 5, a pair of support arms 6 extending outward from the opposite sides of the gear case 5, a pair of opposite brackets 7 secured to the outer ends of the support arms 6 respectively, a rotary cover 8 mounted in position as supported by the brackets 7, a top mast 9 extending upward from the gear case 5, and side masts 10 connecting the top mast 9 to the opposite brackets 7. A tiller tine shaft (not shown) is rotatable about a horizontal lateral axis by the power transmitted from a PTO shaft on the tractor to the gear case 5 via a transmission shaft 11.

The rotary tiller unit 4 shown in FIGS. 1 and 2 further includes a rear wheel support 12 pivoted at its front end to an intermediate portion of each of the support arms 6 and carrying rear wheels 13 at the opposite side ends of its rear portion. The support 12 is connected to the top mast 9 by screw-thread means serving as tilling depth controlling means 14.

One of the preferred embodiments of this invention is adapted to offset the rotary tiller unit 4 either leftward or rightward relative to the tandem position of the unit 4, within the range indicated at E in FIG. 1. The embodiment will be described below in detail. Lateral polygonal tubes 15 and 16 providing polygonal connecting bores are secured to the front ends of the pair of brackets 7 and to the top mast 9 which are extending forwardly of the support arms 6.

Connectors are indicated at 17 and 18. Each of the connectors 17 for the pair of lower links 3 is an L-shaped member comprising a polygonal connecting rod 19 insertable into the polygonal bore of the tube 15 and a base plate 20 secured at a right angle to one end of the connecting rod 19. The connector 17 further includes a hitch pin 21 projecting from the base plate 20 in the opposite direction to the rod 19 and positioned eccentrically of the rod 19. The connecting rod 19 is fittingly inserted into the tube 15, is slidable over the range of the axial length of the rod 19 and can be secured in place by a fastening member 22 such as a set bolt. The connector 18 for the top link 2 is an L-shaped member comprising a polygonal connecting rod 23 insertable into the polygonal bore of the tube 16 and a base plate 24 secured at a right angle to one end of the connecting rod 23. The connector 18 further includes a hitch pin 25 projecting from the base plate 20 in the same direction as the connecting rod 23 and positioned eccentrically of the rod 23. The connecting rod 23 is fittingly inserted into the tube 16, is slidable over the range of the axial length of the rod 23 and can be secured in position by a fastening member 22a such as a set bolt.

The working implement can be connected to the tractor by the preferred embodiment described above in the following manner.

The connecting rods 19 of the connectors 17 are inserted into the tubes 15 on the pair of brackets 7 respectively, while the connecting rod 23 of the connector 18 is inserted into the tube 16 on the top mast 9. With the center line $L_1$ of the tractor body in alignment with the center line $L_2$ of the rotary tiller unit 4, the fastening members 22 and 25 are tightened. Subsequently, the tractor equipped with the three-point link system 1 is driven backward into opposing relation to the rotary tiller unit 4. The hitch pins 21 on the connectors 17 are then inserted into the hitch holes of the connecting portions 3a at the rear ends of the lower links 3. Pins 26 are then fitted in the hitch pins 21 to prevent escapement. The hitch pin 25 on the connector 18 is further inserted into the rear end connecting portion 2a of the top link 2. Similarly as above, a pin 27 is fitted in the hitch pin 25. Consequently, the rotary tiller unit 4 can be connected to the tractor body in the standard arrangement, i.e. in tandem, in which the center line $L_2$ of the unit 4 is in alignment with the center line $L_1$ of the tractor body. To offset the rotary tiller unit 4 thus positioned in tandem either leftward or rightward, for example, rightward, the fastening members 22, 22a are loosened, and the connectors 17, 18 are slidingly moved rightward, with the connecting rods 19, 23 being guided by the polygonal tubes 15, 16, whereby offsetting is effected as indicated at E in FIG. 1. The fastening members 22, 22a are thereafter tightened up. Further regardless of whether the unit 4 is positioned in tandem or in offset arrangement, the pins 26, 27 may be removed, and the connectors 17, 18 then withdrawn to alter the position of the polygonal rods 19, 23 relative to the tubes 15, 16, whereby the points of connection between the connectors 17, 18 and the lower links 3 and top link 2 can be altered in elevation at angular spacing of 60°, because the connecting rods shown are hexagonal in cross section. Moreover, when the connectors 17, 18 are used as reversed from the position shown in FIG. 1, the unit 4 can be offset leftward.

FIGS. 3 to 8 show another preferred embodiment of this invention, which is adapted for a rotary tiller unit 4 equipped with a pair of opposite gauge wheels 28 in the front of the unit, such that the gauge wheels can be brought to an optimum position when the unit is rearranged to tandem or offset position. Basically, this embodiment has much in common with the embodiment of FIGS. 1 and 2. Accordingly common parts are referred to by the same reference numerals.

Figure 4:
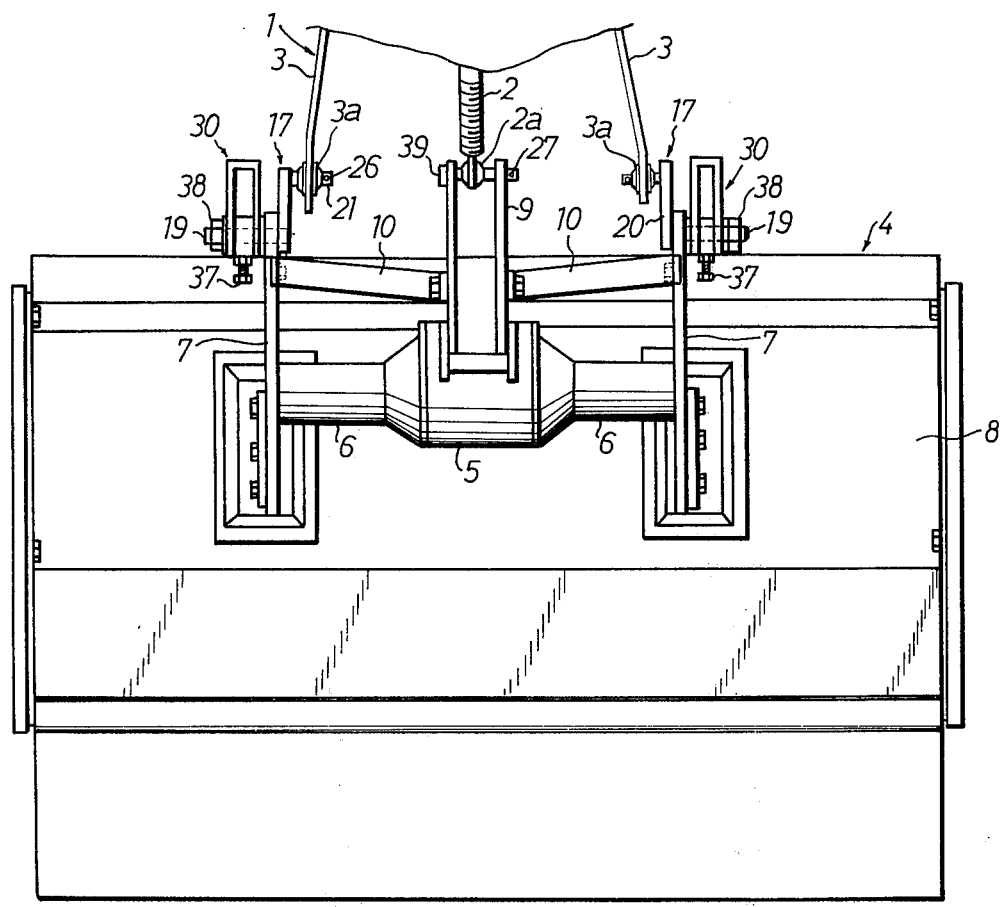
FIG. 4 is a plan view of FIG. 3.

As shown in FIGS. 4 and 5, a pair of brackets 7 are fixedly provided, at their front ends, with polygonal tubes 15 in lateral position. A connector 17 for connection to each of lower links 3 comprises a base plate 20 and a polygonal connecting rod 19 secured to the plate 20 generally in an L-shape. The base plate 20 is further fixedly provided with a hitch pin 21 outwardly extending therefrom and positioned eccentrically of the rod 19. The free end of the connecting rod 19 is externally threaded as at 29.

A gauge mounting member 30 comprises a tubular portion 31 fittable around the connecting rod 19 and a hollow bracket portion 32 extending from the tubular portion 31. When the tubular portion 31 is fitted around the connecting rod 19, the hollow space 33 in the bracket portion 32 extends nearly vertically as seen in FIG. 6. The support rod 34 of the gauge wheel 28 is inserted into the hollow space 33 and can be secured to the bracket portion 32. The bracket portion 32 is therefore formed with a vertically aligned bolt holes 35, while the support rod 34 has axially aligned bolt bores. This makes the gauge wheel 28 vertically adjustable. The tubular portion 31 can be secured to the connecting rod 19 against displacement in the axial direction of the rod by a bolt 37 screwed into a nut 36 fixed to the tubular portion 31.

As seen in FIG. 4 and FIG. 7 (I), the connecting rods 19 of the connectors 17 are inserted into the bores 15a of the tubes 15 on the pair of brackets 7, with the hitch pins 21 of the connectors 17 directed outward. The tubular portions 31 on the gauge mounting members 30 are fitted, outside the brackets 7, around the connecting rod 19, and the nuts 38 are screwed on the externally threaded portions 29, whereby the tubular portions 31 are clamped between the brackets 7 and the nuts 38. The hitch pins 21 are inserted into the hitch holes at the rear end connecting portions 3a of the lower links 3, and pins 26 are fitted in the pins 21. The rear end connecting portion 2a of a top link 2 is pivoted to a top mast 9 and held against escapement by a pin 27. If the mode of connection shown in FIG. 4 and FIG. 7 (I) is so adapted that the center line $L_1$ of the tractor body and the center line 4 of the rotary tiller unit 4 will be in alignment, the connection provides a tandem arrangement.

The rotary tiller unit 4 in tandem position will be offset, for example, rightward in the following procedure. After detaching each lower link 3 and the top link 2, the nut 38 is removed to withdraw the connecting rod 19 from the bore 15a. As shown in FIG. 7 (II), the parts are now so arranged that the tubular portion 31 on the gauge mounting member 30 will be clamped between the inner side of the bracket 7 and the base plate 20 of the connector 17. The nut 38 is then screwed on the externally threaded portion 29, whereby the rotary tiller unit 4 is offset rightward by the amount corresponding to the length of the tubular portion 31 as indicated at E.

Alternatively, if the connector 17 is reversed to direct the hitch pin 21 outward, and the nut 38 is screwed tightly onto the externally threaded portion 28, with the tubular portion 31 interposed between the base plate 20 and the bracket 7, the rotary tiller unit 4 will be offset leftward as indicated at E in FIG. 8 (I). Another variation in position will result from the arrangment shown in FIG. 8 (II) in which the tubular portion 31 is clamped between the bracket 7 and the nut 38, with the hitch pin 21 on the connector 17 directed outward. Further variation will be available if the hitch pin 21 of the connector 17 on the left side is directed outward, while the hitch pin 21 of the connector 17 on the right is inwardly directed, with each tubular portion 31 interposed between the bracket 7 and the nut 38 or base plate 20. Thus with the use of the embodiment shown in FIGS. 3 to 6, the working implement can be connected to the tractor by a three-point link in an optimum condition in accordance with the size of the tractor and the type of the working implement. Moreover in conformity with the special characteristics of the work to be involved, the implement can be offset by an optimum amount and, at the same time, the gauge wheels are shiftable to support the weight of the implement in stable and reliable manner for improved work efficiency.

When connecting the working implement to the tractor by a three-point link in either of tandem and offset position, the present invention assures that the implement in one position can be readily shiftable to the other position and vice versa, by sliding the connectors sidewise and then locking them in position, or by reversing the connectors. Furthermore, the hitch pin of the connector, which can be altered in elevation as desired, is easy to fit in the hitch hole of the link element, rendering the implement readily amenable to a particular work environment such as a sloping field. The device has another advantage that when the work implement is shifted, the gauge wheels are also shifted to an optimum position at the same time.

Although this invention has been described above with reference to the preferred embodiments, the invention may be modified variously without departing from the scope of the invention as defined in the appended claims.

For instance, this invention is similarly applicable to a plow, cultivator or other working implements in place of the rotary tiller unit described. The gauge wheel may be replaceable by a sled or the like

What is claimed is:

1. A device for connecting a working implement to a tractor including a three-point link, the device comprising generally L-shaped connectors each including a base plate with a projecting connecting rod and hitch pin, said hitch pins to be inserted into respective hitch holes at the rear end of the three-point link and each projecting from the connector eccentrically of the connecting rod, the connecting rod being slidable and fixedly mountable in a connecting bore formed in a frame of the implement laterally thereof to render the working implement connectable to the tractor in either of interchangeable tandem and offset arrangements.

2. A connecting device as defined in claim 1 wherein the connecting rod of the connector has a polygonal cross section, and the connecting bore for mounting the connecting rod is defined by a tube, the connecting rod being slidable laterally of the implement by virtue of the cooperating of the connecting rod and the inside surface of the tube defining the connecting bore, the tube being provided with a fastening member for securing the connecting rod.

3. A connecting device as defined in claim 1 wherein the connector is reversible to direct the hitch pin inward and to render the connector slidable and fixedly mountable in the connecting bore.

4. A device for connecting a working implement to a tractor including a three-point link, the device comprising a pair of opposite brackets projecting forward from the working implement and each having an open connecting bore extending laterally thereof, generally L-shaped connectors each including a connecting rod and a base plate having a hitch pin for pivotably supporting a lower link element of the three-point link, and gauge mounting members each including a tubular portion fittable around the connecting rod and a gauge member mounting portion integral with the tubular portion, the connecting rod being insertable into and removable from the connecting bore, the connector being reversible, the tubular portion of the gauge mounting member being fixedly mountable on the connecting rod either outside or inside the bracket selectively when the connector is mounted in position to render the working implement connectable to the tractor in either of interchangeable tandem and offset arrangements.

5. A connecting device as defined in claim 4 wherein the connecting rod of the connector has a polygonal cross section, and the connecting bore for mounting the connecting rod is defined by a tube, the tubular portion of the gauge mounting member being in the form of a tube fittable around the connecting rod.

* * * * *